(12) United States Patent
Wang et al.

(10) Patent No.: US 10,462,725 B2
(45) Date of Patent: *Oct. 29, 2019

(54) SYSTEMS AND METHODS FOR IMPROVED DATA SPEEDS FOR WIRELESS DEVICES

(71) Applicant: Futurewei Technologies, Inc., Plano, TX (US)

(72) Inventors: Julia Wang, San Diego, CA (US); Navid Nader, San Diego, CA (US); Zhiping Jia, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/278,231

(22) Filed: Sep. 28, 2016

(65) Prior Publication Data

US 2017/0064605 A1    Mar. 2, 2017

Related U.S. Application Data

(63) Continuation of application No. 14/836,425, filed on Aug. 26, 2015, now Pat. No. 9,485,697.

(51) Int. Cl.
*H04W 36/00* (2009.01)
*H04W 36/32* (2009.01)
(Continued)

(52) U.S. Cl.
CPC .......... *H04W 36/32* (2013.01); *H04W 28/08* (2013.01); *H04W 36/04* (2013.01); *H04W 36/22* (2013.01);
(Continued)

(58) Field of Classification Search
CPC ..... H04W 36/32; H04W 28/08; H04W 36/04; H04W 36/22; H04W 76/027;
(Continued)

(56) References Cited

U.S. PATENT DOCUMENTS

| 8,688,166 | B2 | 4/2014 | Gupta et al. |
| 8,934,339 | B2 | 1/2015 | Suzuki et al. |
| 9,357,461 | B2 | 5/2016 | Jung et al. |
| 2010/0240367 | A1 | 9/2010 | Lee et al. |

(Continued)

FOREIGN PATENT DOCUMENTS

| CN | 102413580 A | 4/2012 |
| CN | 103038652 A | 4/2013 |
| CN | 103988549 A | 8/2014 |
| CN | 104025655 A | 9/2014 |

(Continued)

*Primary Examiner* — Huy C Ho
(74) *Attorney, Agent, or Firm* — Slater Matsil, LLP

(57) ABSTRACT

A system and method for improving the user experience with a mobile wireless device by reconnecting to a faster speed connection after being rejected for the higher speed by an overloaded cell before expiration of a de-prioritization timer when the mobile wireless device travels away from the overloaded cell. In an embodiment, a method includes receiving from the first cell a connection rejection instructing the mobile wireless device to de-prioritize one or more frequencies of the first connection technology and a de-prioritization timer indicating a time period for the frequencies to remain de-prioritized; determining that the mobile wireless device has left the coverage area of the first cell; and connecting to a second cell of the telecommunication network via a connection in the one or more frequencies of the first connection technology prior to the expiration of the de-prioritization timer.

20 Claims, 14 Drawing Sheets

(51) Int. Cl.
*H04W 76/18* (2018.01)
*H04W 76/27* (2018.01)
*H04W 28/08* (2009.01)
*H04W 36/04* (2009.01)
*H04W 36/22* (2009.01)
*H04W 48/20* (2009.01)

(52) U.S. Cl.
CPC ........... *H04W 76/18* (2018.02); *H04W 76/27* (2018.02); *H04W 48/20* (2013.01)

(58) Field of Classification Search
CPC ... H04W 76/046; H04W 48/20; H04W 16/00; H04W 16/02; H04W 16/14; H04W 16/18; H04W 24/02
USPC .......................................................... 455/436
See application file for complete search history.

(56) References Cited

U.S. PATENT DOCUMENTS

| | | |
|---|---|---|
| 2014/0099969 A1 | 4/2014 | Hwang et al. |
| 2014/0120915 A1* | 5/2014 | Wu ....................... H04W 60/04 455/435.3 |
| 2014/0198640 A1 | 7/2014 | Suzuki et al. |
| 2014/0329529 A1 | 11/2014 | Jung et al. |
| 2015/0304918 A1 | 10/2015 | Jung et al. |

FOREIGN PATENT DOCUMENTS

| | | |
|---|---|---|
| CN | 104521291 A | 4/2015 |
| EP | 2950585 A1 * | 2/2015 |
| EP | 2577332 B1 | 9/2016 |
| WO | 2014024123 A1 | 2/2014 |
| WO | 2014069890 A1 | 5/2014 |

\* cited by examiner

US 10,462,725 B2

SYSTEMS AND METHODS FOR IMPROVED DATA SPEEDS FOR WIRELESS DEVICES

This application is a continuation application of U.S. patent application Ser. No. 14/836,425, filed Aug. 26, 2015, titled "Systems and Methods for Improved Data Speeds for Wireless Devices," which application is hereby incorporated by reference.

TECHNICAL FIELD

The present invention relates generally to a system and method for system reselection by a wireless device, and, in particular embodiments, to a system and method for network load balancing and system reselection for improved user experience.

BACKGROUND

With the increasing number of wireless devices and events that congregate large numbers of people in a small area, there has been a tendency to overload Radio Access Technology (RAT) at times. In order to resolve the mobile wireless device carrier frequency or RAT overloaded issue and to help networks to perform load balancing, a de-prioritization feature has been added to the 3rd Generation Partnership Project (3GPP) Long Term Evolution (LTE)-Advanced specification. According to the 3GPP specification, if a user equipment (UE) receives an RRC Connection Reject message with a de-prioritization request, the UE shall consider the current carrier frequency or all of the frequencies of the Evolved Universal Mobile Telecommunications System (UMTS) Terrestrial Radio Access (E-UTRA) to be the lowest priority frequency while the de-prioritization timer, T325 is running irrespective of camped RAT. The 3GPP specification defines a total of 4 timer values: 5 minutes, 10 minutes, 15 minutes, and 30 minutes. The timer controls the duration for which the de-prioritization is valid. During the de-prioritization period, for de-prioritization type E-UTRA, the UE must use other RATs (for example, 3G) rather than 4G LTE when accessing the RAT network; for de-prioritization type frequency, the UE must use other RATs (for example, 3G/2G) rather than 4G LTE when trying to access the RAT network if reselect to a LTE cell with different frequency fails. However, the user experience with 3G is poor as compared to 4G LTE since the data throughput for 3G is lower than for 4G LTE. Furthermore, for the same unit of data being transmitted, the power consumption of 4G is superior to that of 3G because of the faster throughput rates of 4G.

SUMMARY

In accordance with an embodiment of the present invention, a method performed by a mobile wireless device for connecting to a telecommunication network, includes sending a request to connect to a first cell of the telecommunication network, wherein the first cell implements a first connection technology; receiving from the first cell a connection rejection comprising a de-prioritization request, the de-prioritization request instructing the mobile wireless device to de-prioritize one or more frequencies of the first connection technology and comprising a de-prioritization timer indicating a time period for the one or more frequencies to remain de-prioritized; in response to the de-prioritization request, connecting to the telecommunication network via a connection of a second connection technology, wherein the connection of the second connection technology is of a higher priority than the de-prioritized frequencies of the first connection technology but is of a lower data rate compared to the frequencies of the first connection technology; determining that the mobile wireless device has left the coverage area of the first cell; and connecting to a second cell of the telecommunication network via a connection in one of the frequencies of the first connection technology prior to the expiration of the de-prioritization timer.

In accordance with another embodiment, a mobile wireless device includes a processor and a non-transitory computer readable storage medium storing programming for execution by the processor, the programming including instructions to: send a request to connect to a first cell of the telecommunication network, wherein the first cell implements a first connection technology; receive from the first cell a connection rejection comprising a de-prioritization request, the de-prioritization request instructing the mobile wireless device to de-prioritize one or more frequencies of the first connection technology and comprising a de-prioritization timer indicating a time period for the one or more frequencies to remain de-prioritized; connect to the telecommunication network via a connection of a second connection technology in response to the de-prioritization request, wherein the connection of the second connection technology is of a higher priority than the de-prioritized one or more frequencies of the first connection technology but is of a lower data rate compared to the one or more frequencies of the first connection technology; determine that the mobile wireless device has left the coverage area of the first cell; and connect to a second cell of the telecommunication network via a connection in the frequency range of the first connection technology prior to the expiration of the de-prioritization timer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
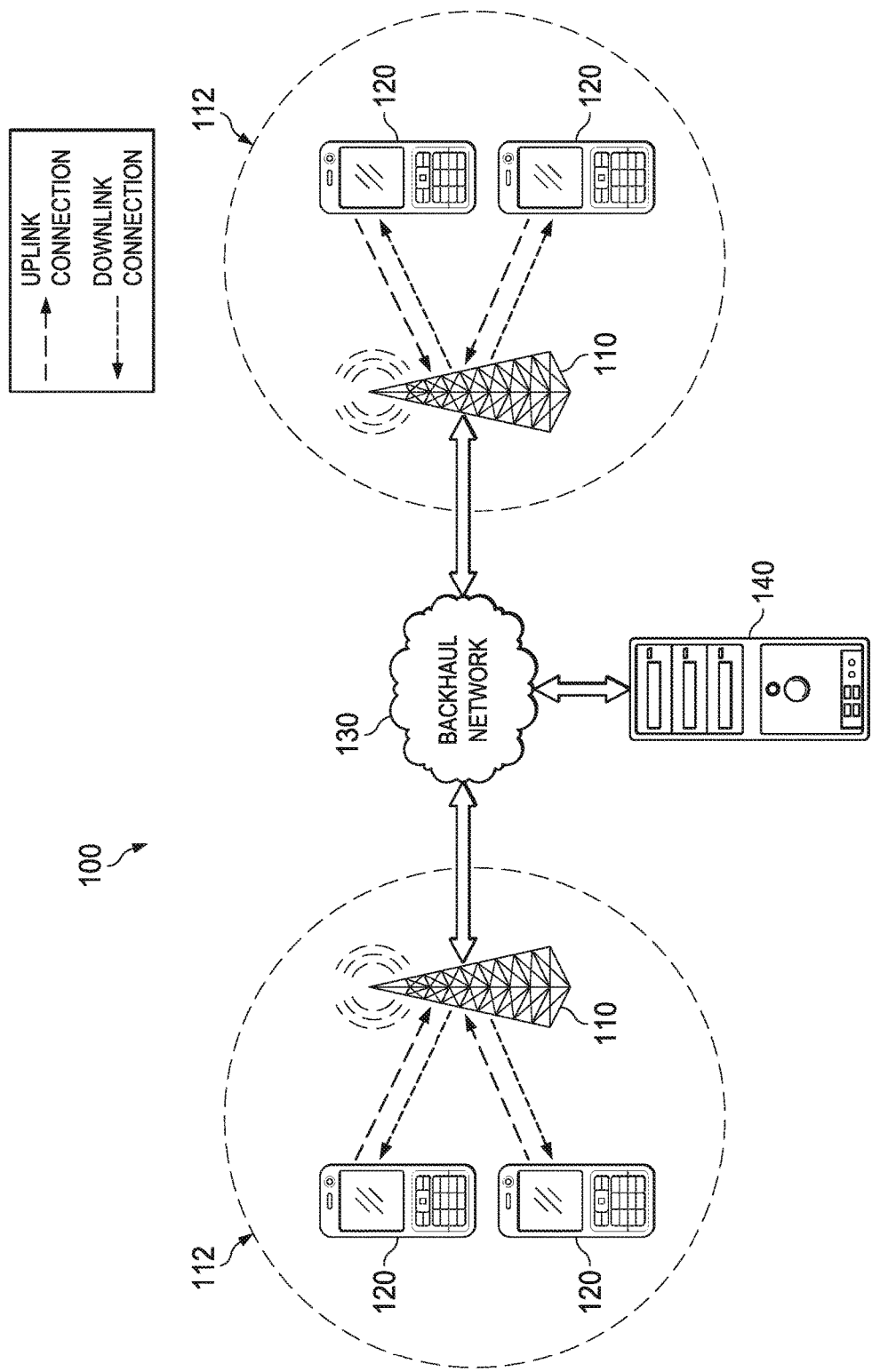
FIG. 1 illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Unless otherwise indicated, whenever the phrase "A, B, C, or D," "at least one of A, B, C, or D," "at least one of A, B, C, and D," or similar phrases occur, these phrases should be interpreted to include A only; B only; C only; D only; A and B; A and C; A and D; B and C; B and D; C and D; A, B, and C; A, B, and D; A, C, and D; B, C, D; and A, B, C, and D.

One issue with this de-prioritization timer is that the UE may leave the overloaded LTE cell and enter into a lightly loaded LTE cell rather quickly, but still be forced to remain on 3G because the de-prioritization timer has not expired. Thus, the user experience is lower for a longer period of time than is necessary. As noted above, the de-prioritization timer can be as long as 30 minutes. A user may become frustrated if the user is paying for 4G and becomes aware that he/she is being forbidden to use 4G for several minutes or longer. The sooner a UE is allowed on 4G LTE, the better the user experience a user can have and the UE could potentially consume less power.

Disclosed herein are systems and methods to resolve the de-prioritization of frequency and E-UTRA issues in the current 3GPP solution to provide a better user experience and UE battery power consumption. In an embodiment, the de-prioritization timer is cleared immediately (or after a timer to clear the de-prioritization timer expires) upon the UE detecting that it has traveled out of the overloaded LTE cell. Many different criterions may be utilized by the UE to determine when it has traveled out of the overloaded LTE cell. For example, in Code Division Multiple Access (CDMA) systems, the UE may consider that it has traveled outside of the overloaded LTE cell after M consecutive different base station, cell changes, reselections, and/or handovers; after traveling a predefined/configurable distance, L, from the cell; after a registration zone change; or after a system identification number (SID) or a network identification number (NID) change. M is a configurable integer and L is a configurable value. However, in an embodiment, M consecutive different cell reselections/handovers does not count consecutive reselections between the same two cells (and among the same set of cells) into the detection criteria if the same cell (or the same set of cells) is reselected just after one other reselection. In Global System for Mobile Communications (GSM)/Wideband-CDMA (WCDMA), the UE may consider that it has traveled out of the overloaded LTE cell when N consecutive different cell changes, reselections, or handovers have occurred; or when a routing area or location are has changed, where N is a configurable integer. (Note, CDMA refers to the 3GPP2 specification, which includes CDMA 1×, 1× Advanced, and 1×EV-D0 r0/rA/rB. WCDMA refers to the 3GPP specification, which includes WCDMA r99, HSDPA, DB-HSDPA, HSUPA, HSPA+, DC-HSPA+, r9 DC-HSUPA, r9 DC+MIMO+64-QAM HSDPA, and r11 4C HSDPA+. GSM refers to the 3GPP specification which includes GSM, GPRS, and EDGE.) For all RATs, the UE may consider that it has traveled out of the overloaded LTE cell after a geographical region or location group change. These criterion enumerated above are merely examples and the criterion are not limited to those described above. Those of ordinary skill in the art will recognize that other criteria may be utilized for determining when the UE has traveled out of the overloaded LTE cell area. All the criterions used to determine whether a UE has traveled out of an overloaded cell/BS is referred to as a detection criteria of UE traveling out of overloaded cell/BS.

Disclosed herein are methods and systems to improve and enhance the de-prioritization of a particular RAT and/or frequency for an improved wireless communication device user experience. In particular embodiments, disclosed are methods and systems to improve and enhance the de-prioritization of Evolved Universal Terrestrial Radio Access (E-UTRA/e-utra) and frequency (defined in the 3GPP specification) for an improved wireless communication device user experience. In an embodiment, a wireless communication device sends an RRC Connection Request (RRCConnectionRequest) to the acquired LTE cell. The wireless communication device receives a RRC Connection Reject (RRCConnectionReject) and the de-prioritization request (deprioritisationReq Information Element (IE)) is present indicating that E-UTRA is to be de-prioritized and the period for which the E-UTRA is to be de-prioritized. The wireless communication device starts the de-prioritization process (e.g., sets the priority of all the frequencies of the E-UTRA to be the lowest, starts the de-prioritization timer, etc.). The wireless communication device performs cell reselection (in an embodiment, the cell reselection is triggered by the change of frequency priority) based on standard cell reselection procedures/criteria as defined in the 3GPP specification. The wireless communication device reselects to the next most preferred, available system (for example, 1×EV-DO or WCDMA) according to the cell reselection criteria. The wireless communication device clears the de-prioritization of E-UTRA when it detects that the wireless communication device has traveled out of the overloaded LTE cell instead of waiting for the expiration of the de-prioritization timer. A set of criterions to detect whether a wireless communication device has traveled out of the overloaded LTE cell are configurable and can be defined based on the requirements of the particular implementation. The wireless communication device clears the de-prioritization of E-UTRA when it determines that the criteria of detecting the wireless communication device has traveled out of the overloaded LTE cell has been met instead of waiting for the expiration of the de-prioritization timer. The wireless communication device performs cell reselection (in an embodiment, the cell reselection is triggered by the change of frequency priority) according to, for example, standard cell reselection procedures/criteria defined in the 3GPP/3GPP2 specification. The wireless communication device reselects to the most preferred, available system (for example, LTE) according to the cell reselection criteria.

In an embodiment, methods and systems for de-prioritization of a frequency are disclosed. A wireless communication device sends a RRC Connection Request (RRCConnectionRequest) to the acquired LTE cell. The wireless communication device receives a RRC Connection Reject (RRCConnectionReject) and the de-prioritization request (deprioritisationReq Information Element (IE)) is present indicating that the current carrier frequency is to be de-prioritized and the period for the frequency is de-prioritized. The wireless communication device starts the de-prioritization process (e.g., set the priority of the frequency to be the lowest, start the de-prioritization timer, etc.). The wireless communication device performs cell reselection (in an embodiment, the cell reselection is triggered by the change of frequency priority) based on, for example, standard cell reselection procedures/criteria as defined in the 3GPP specification. The wireless communication device reselects to the next most preferred available system according to the cell reselection criteria. In an embodiment, the next most preferred system is a non de-prioritized carrier frequency of the LTE cell followed by a 1×EV-DO or a WCDMA if no other carrier frequencies are available for the LTE cell or if all carrier frequencies for the LTE cell have been deprioritized. The wireless communication device clears the de-prioritization of the frequency when it detects that the wireless communication device has traveled out of the overloaded LTE cell instead of waiting for the expiration of the de-prioritization timer. The set of criterions to detect whether a wireless communication device has traveled out of the overloaded LTE cell is configurable and can change dynamically. The wireless communication device performs cell reselection (in an embodiment, the cell reselection is triggered by the change of priority) according to, for example, standard cell reselection procedures/criteria as defined in the 3GPP/3GPP2 specification. The wireless communication device reselects to the most preferred, available system (for example, a LTE cell) according to the cell reselection criteria.

As used herein, a wireless communication device can be a user equipment (UE), an access terminal (AT), a mobile station (MS), a mobile wireless device, a mobile wireless communication device, a smartphone, a wirelessly enabled tablet computer, or any other type of wireless communication device. The terms wireless communication device, mobile wireless device, mobile wireless communication device, UE, AT, and MS are used interchangeably throughout this disclosure. In 3GPP LTE and in wideband code division multiple access (WCDMA/UMTS), the wireless communication device is typically referred to as a UE. In 1×EV-DO, the wireless communication device is typically referred to as an AT and in CDMA1× and GSM, the wireless communication device is typically referred to as a MS.

Evolved Universal Terrestrial Radio Access (E-UTRA/e-utra) is the air interface of 3GPP's LTE.

One advantage of utilizing the disclosed systems and methods is, in one embodiment, allowing the UE to be back on the 4G LTE network as soon as it detects that it has traveled out of the overloaded LTE cell without waiting for the expiration of the de-prioritization timer. Therefore, the UE can obtain much higher data rate service and the UE battery power consumption can be improved. In some embodiments, the UE can obtain high speed LTE service up to 30 minutes earlier than would occur if the UE had to wait until the expiration of the de-prioritization timer. This improvement in data rate service and UE battery power consumption results in a better user experience. Furthermore, it reduces the likelihood that the user becomes frustrated or angry for paying for 4G service, by becoming aware that he/she is being forbidden from accessing 4G service for several minutes or longer.

It should be noted that the disclosed systems and methods can be applied to any RAT and network hierarchical levels (not merely between 3G and 4G, but between any two systems having a disparity in the quality of the user experience between the two systems), thereby leading to an improvement in user experience and UE battery power consumption. The disclosed systems and methods apply to the UE in both the idle mode and the connected mode. The disclosed systems and methods resolve issues not handled by the 3GPP specification and can be easily adopted in the current 3GPP specification.

It should also be noted that in some embodiments, the RAT generation (e.g., 4G LTE, 3G, etc.) is not de-prioritized, but rather the current carrier frequency is de-prioritized. In an embodiment, a UE can store a de-prioritization request for up to 8 frequencies (applicable when receiving another frequency specific de-prioritization request before de-prioritization timer T325 expiry). In such a circumstance, the UE can access a LTE cell at a different frequency which is not de-prioritized. The de-prioritization timer T325 is only applied to the frequency/frequencies which are de-prioritized.

FIG. 1 illustrates a network 100 for communicating data. The network 100 comprises a plurality of base stations (BSs) 110 each having a coverage area 112, a plurality of user equipment (UEs) 120, a backhaul network 130, and a central server 140. In some embodiment, the coverage areas 112 may overlap. As used herein, the term BS may also be referred to as a cell, an E-UTRAN Node B (eNB), a base transceiver station (BTS), an access point (AP), or a transmission point, and these terms may be used interchangeably throughout this disclosure. The BS 110 may comprise any component capable of providing wireless access by, inter alia, establishing uplink (dashed line) and/or downlink (dotted line) connections with the UEs 120, such as a BTS, an eNB, a femtocell, and other wirelessly enabled devices. The UEs 120 may comprise any component capable of establishing a wireless connection with the BS 110. Examples of UEs include smart phones, laptop computers, and tablet computers. The backhaul network 130 may be any component or collection of components that allow data to be exchanged between the BS 110 and a remote end (not shown) and with the central server 140. In some embodiments, the network 100 may comprise various other wireless devices, such as relays, femtocells, etc.

If one of the BSs 110 is experiencing overloaded conditions due, for example, to an area of unusual crowd density (e.g., a sporting event, a convention, etc.), in order to relieve the overload condition, the BS 110 may require that some of the UEs 120 de-prioritize a higher data rate more preferred RAT (e.g., 4G LTE). UEs 120 attempting to connect to a BS 110 that is experiencing overloaded conditions will receive a connection reject message with a de-prioritization type and a timer value. The reject message may be required for load balancing or other issues. This reject message instructs the UE 120 to de-prioritize frequency or RTA and provides the UE 120 with a timer indicating when the UE 120 may clear the de-prioritization of the frequency or RAT. The de-prioritization request from the BS triggers the UE to perform system reselection and the UE may fall back to a 3G system. However, if the UE 120 travels out of the overloaded BS 110, the UE 120 may clear the de-prioritization of frequency or RAT, and reselect back to the higher data rate more preferred system (e.g., reselect back to 4G LTE from 3G) before the expiration of the timer. This is possible since the new BS 110 may not be experiencing overloaded conditions and therefore, does not need the UE 120 to remain in the less preferred system.

The condition that allows the UE 120 to clear the de-prioritization of frequency or RAT to reselect back to the de-prioritized frequency or RAT before the expiration of the timer is referred to as an detection criteria of the UE traveling out of an overloaded BS. If the detection criteria is not met, the UE 120 can not clear the de-prioritization request and may have to remain on the systems it falls back to until the timer expires. The detection criteria may utilize a measurement that the UE 120 already performs for other reasons, thereby minimizing the impact of the reselect mechanism on battery power consumption. However, it is not necessary that the detection criteria utilize a measurement already required of the UE 120. In some embodiments, the UE 120 may be required to perform a measurement not otherwise needed by the UE 120 in order to determine whether the detection criteria has been satisfied.

There are many possible conditions that may be used to determine whether the UE 120 has traveled out of the overloaded cell/BS. For example, the detection criteria of UE traveling out of overloaded cell/BS may define a certain distance, L, that the UE 120 must have traveled away from the overloaded BS 110 in order to disregard the timer and reselect back to the de-prioritized frequency or RAT (e.g., 4G LTE) prior to the expiration of the timer. The distance, L, is configurable and may be dynamically configurable.

Other detection criteria of UE traveling out of overloaded cell/BS may require the UE 120 to travel M consecutive different base station, cell changes, reselections, or made M reselections/handovers before being allowed to clear the de-prioritization of frequency or RAT, where M is a configurable integer value. The detection criteria may require a registration zone change, a SID change, or a NID change. The detection criteria may require a geographical region or location group change by the UE 120. In some embodiments, consecutive reselections between the same two cells (or among the same set of cells) may not count toward the value of M in order to satisfy the detection criteria. This may be necessary in some embodiments to prevent the situation in which a user travels from the overloaded cell to a neighbor cell and then back to the overloaded cell. If the value of M for the detection criteria is two, then without the condition that consecutive reselections between two consecutive cells not applying toward the value of M, the UE 120 would reselect back to the previous cell/BS that is overloaded and incapable of handling more devices. The examples of detection criteria provided above are merely examples and those of ordinary skill in the art will recognize that the detection criteria is not limited to these examples, but that other conditions and criteria may be utilized for the detection criteria.

In an embodiment, the configurable values of M and/or L is implementation dependent. An added option is to apply a scaling factor (f) which is based on the T325 timer value defined by a BS to the configurable values of M and/or L (f(M)=f×M; f(L)=f×L). For example, if 5 minutes is selected, a smaller scaling factor (f<1) can be used. If 30 minutes is selected, a larger scaling factor (f>1) is used. However, the particular manner in which the scaling factor corresponds to the timer value may be varied and is implementation dependent, or based on user and/or service provider preferences allowing particular goals to be satisfied.

In an embodiment, rather than specifying that a particular RAT (e.g., 4G LTE) must be de-prioritized, the BS 110 may indicate that a particular current carrier frequency must be de-prioritized. In such a situation, if there are other cells/BSs with different frequencies around, then the UE 120 may reselect to a cell/BS with a different carrier frequency based on system reselection criteria/requirements without waiting for the T325 timer to expire. In an alternate, but similar embodiment, the UE 120 may fall back to a cell/BS of another RAT (e.g., a 3G RAT) and remain on the 3G RAT until the UE moves away from the overloaded BS 110 and meets the detection criteria of out of overloaded cell/BS before reconnecting to a cell/BS with the same frequency as the de-prioritized frequency before the expiration of the T325 timer.

Figure 2:
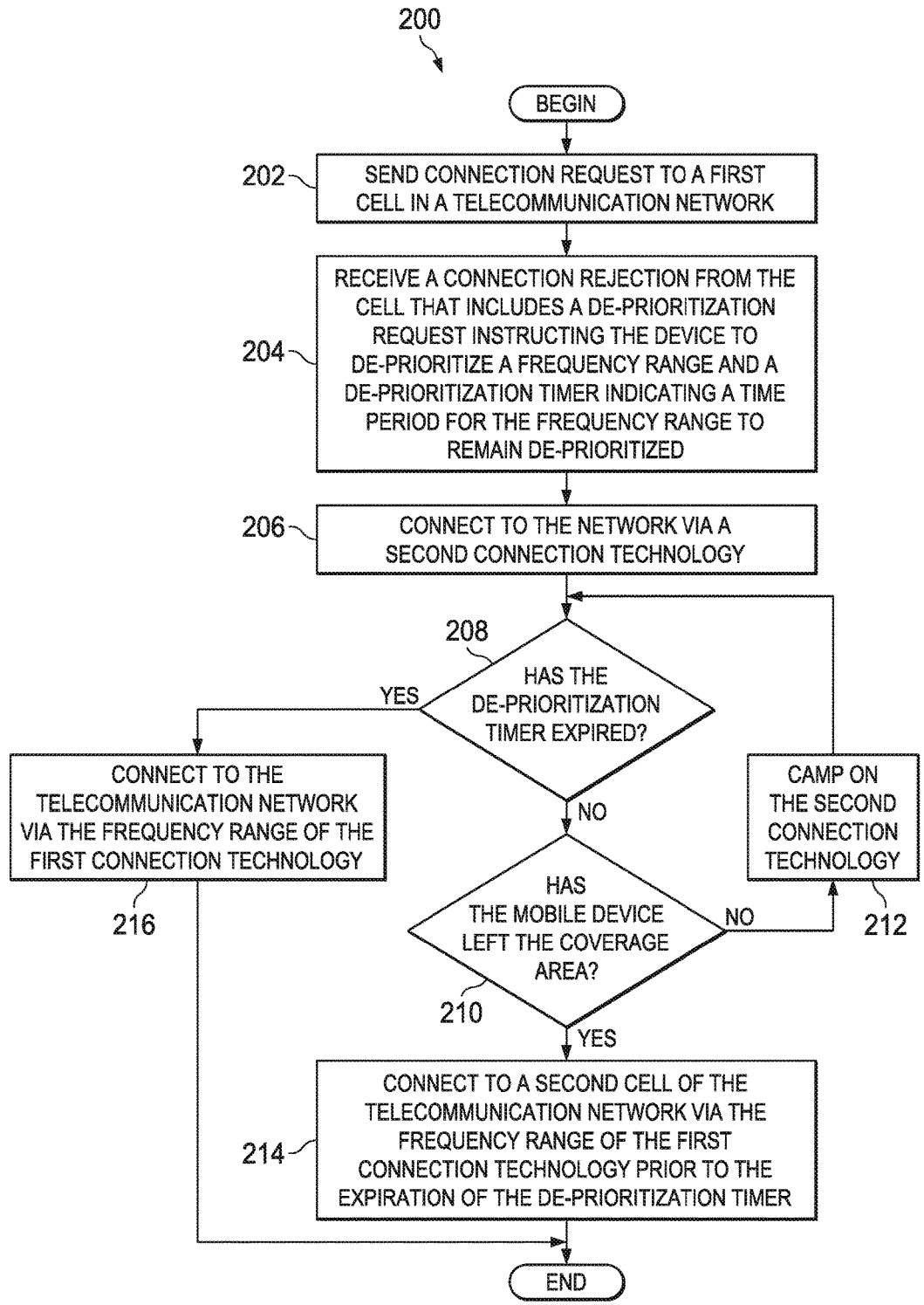
FIG. 2 is a flowchart of an embodiment of a method in a UE for system reselection back to a preferred system.

FIG. 2 is a flowchart of an embodiment of a method 200 in a UE for connecting to a telecommunication network. The method 200 begins at block 202 where the UE sends a connection request to a first cell in a telecommunication network, wherein the first cell implements a first connection technology that uses a first frequency range. At block 204, the UE receives a connection rejection from the first cell that includes a de-prioritization request instructing the UE to de-prioritize the frequency range of the first connection technology. The connection rejection also includes a de-prioritization timer indicating a time period for the frequency range to remain de-prioritized. At block 206, the UE connects to the telecommunication network via a second connection technology that uses a different frequency range from the first frequency range utilized by the first connection technology. The second connection technology may provide slower data speeds and, therefore, be less preferred by the user. At block 208, the UE determines whether the de-prioritization timer has expired. If, at block 208, the de-prioritization timer has expired, then method 200 proceeds to block 216 where the UE connects to the telecommunication network via the frequency range of the first connection technology, after which, the method 200 ends. If, at block 208, the de-prioritization timer has not expired, then the method 200 proceeds to block 210 where the UE determines whether the UE has left the coverage area.

There are a number of methods by which the UE may determine that it has left the coverage area of the overloaded cell. In an embodiment, the UE determines that it has left the coverage area of the overloaded cell by determining that the mobile wireless device has traveled a predetermined distance from the first cell. In an embodiment, the UE determines that it has left the coverage are by determining that it has executed M consecutive different cell changes, M consecutive reselections, M consecutive handovers, or M consecutive BS changes, where M is a predefined integer and is configurable. In an embodiment, the UE determines that it has left the coverage area of the overloaded cell by determining a geographical region change. In an embodiment, the UE determines that it has left the coverage area of the overloaded cell according to detection criteria received from the overloaded cell or from some other cell in the network.

If, at block 210, the UE determines that the UE has not left the coverage area, then the method 200 proceeds to block 212 where the UE camps on the second connection technology after which, the method 200 proceeds to block 208. As used herein, the term "camp" means that the UE has completed the cell selection/reselection process and has chosen a TP (e.g., a cell or cell tower). The UE monitors system information and (in most cases) paging information (i.e., the UE is in the idle state), or the UE has a Radio Resource Control (RRC) connection with the TP (i.e., the UE is in a connected state). If, at block 210, the UE has left the coverage area, then the method 200 proceeds to block 214 where the UE connects to a second cell of the telecommunication network via the frequency range of the first connection technology prior to the expiration of the de-prioritization timer, after which, the method 200 ends.

Figure 3:
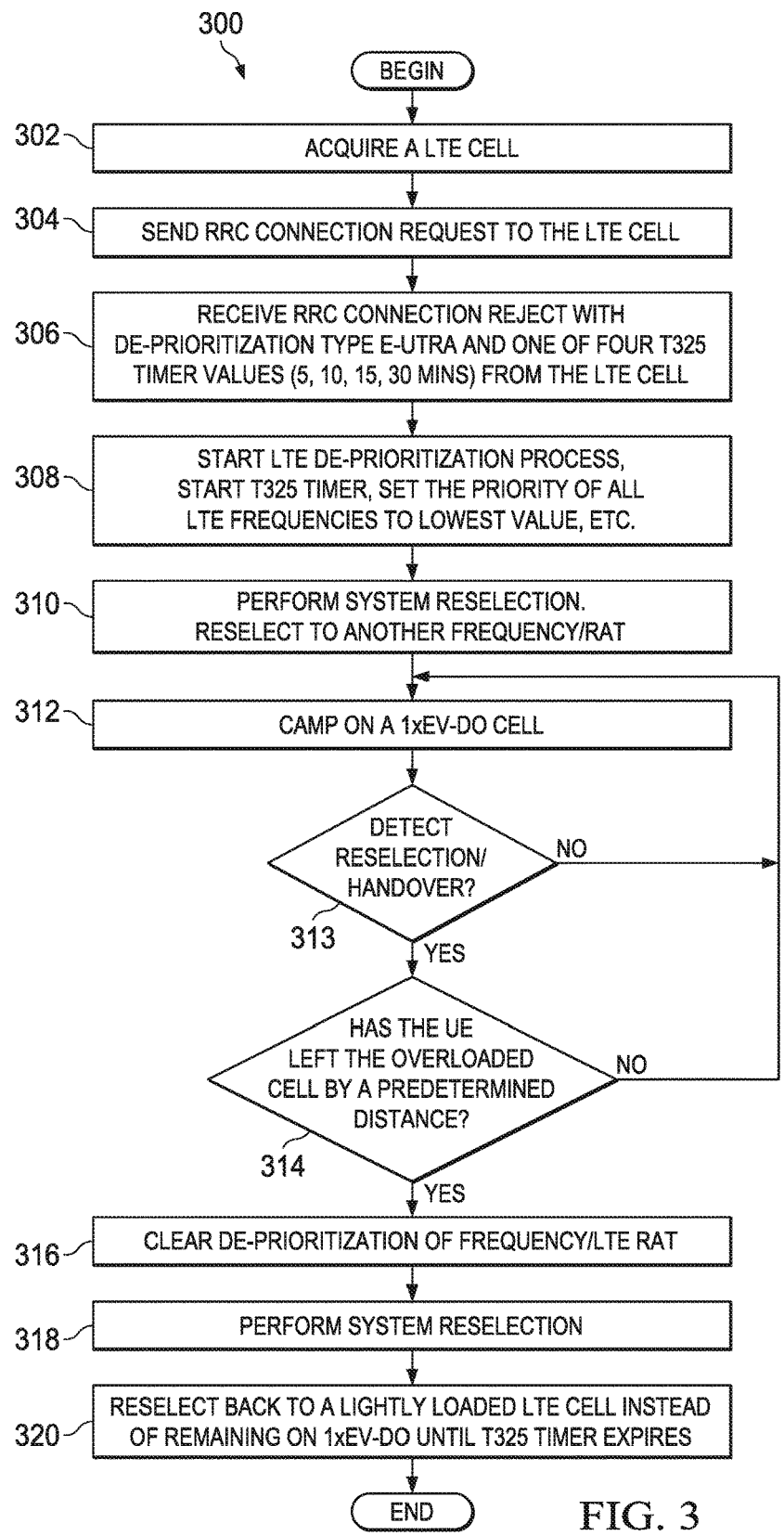
FIGS. 3-5, 6A, 6B, and 7 are flowcharts of various embodiments of methods in a UE for handling de-prioritization of E-UTRA, wherein the UE clears the de-prioritization of LTE RAT before the de-prioritization timer expires if and after the UE travels outside of the overloaded LTE cell.

FIG. 3 is a flowchart of an embodiment of a method 200 in a UE for handling de-prioritization of E-UTRA. The UE clears de-prioritization immediately without waiting for T325 to expires after the UE detects that the detection criteria of UE traveling out of overloaded LTE cell is met. The method 300 is an example of an embodiment using a distance, L, as a detection criteria to determine whether the UE has traveled out of the overloaded LTE cell. The method 300 begins at block 302 where the UE acquires a LTE cell. In block 304, the UE sends a RRC connection request to the LTE cell. At block 306, the UE receives a RRC connection reject with a de-prioritization type E-UTRA and one of four T325 timer values (e.g., 5, 10, 15, or 30 minutes) from the LTE cell. At block 308, the UE starts the LTE de-prioritization process, starts the T325 timer, sets the priority of all LTE frequencies to the lowest value, and performs other procedures necessary. At block 310, the UE performs system reselection to another frequency/RAT. At block 312, the UE camps on the other frequency (e.g., on a 1×EV-DO r0/rA/rB cell). At block 313, the UE determines whether a reselection/handover has occurred. If, at block 313, a reselection/handover has occurred, the method 300 proceeds to block 314, otherwise, the method 300 proceeds back to block 312. At block 314, the UE determines if the UE has left the overloaded LTE cell area by at least a predetermined distance, L. If, at block 314, the answer is no, then the method 300 proceeds back to block 312. If, at block 314, the answer is yes, then the method 300 proceeds to block 316 where the UE clears the de-prioritization of the LTE RAT (e.g., clear the T325 timer, etc.). At block 318, the UE performs system reselection. At block 320, the UE reselects back to a lightly loaded LTE cell using the frequency range of the first connection technology (e.g., a LTE frequency range) instead of remaining on 1×EV-DO cell until the T325 timer expires, after which, the method 300 ends.

Figure 4:
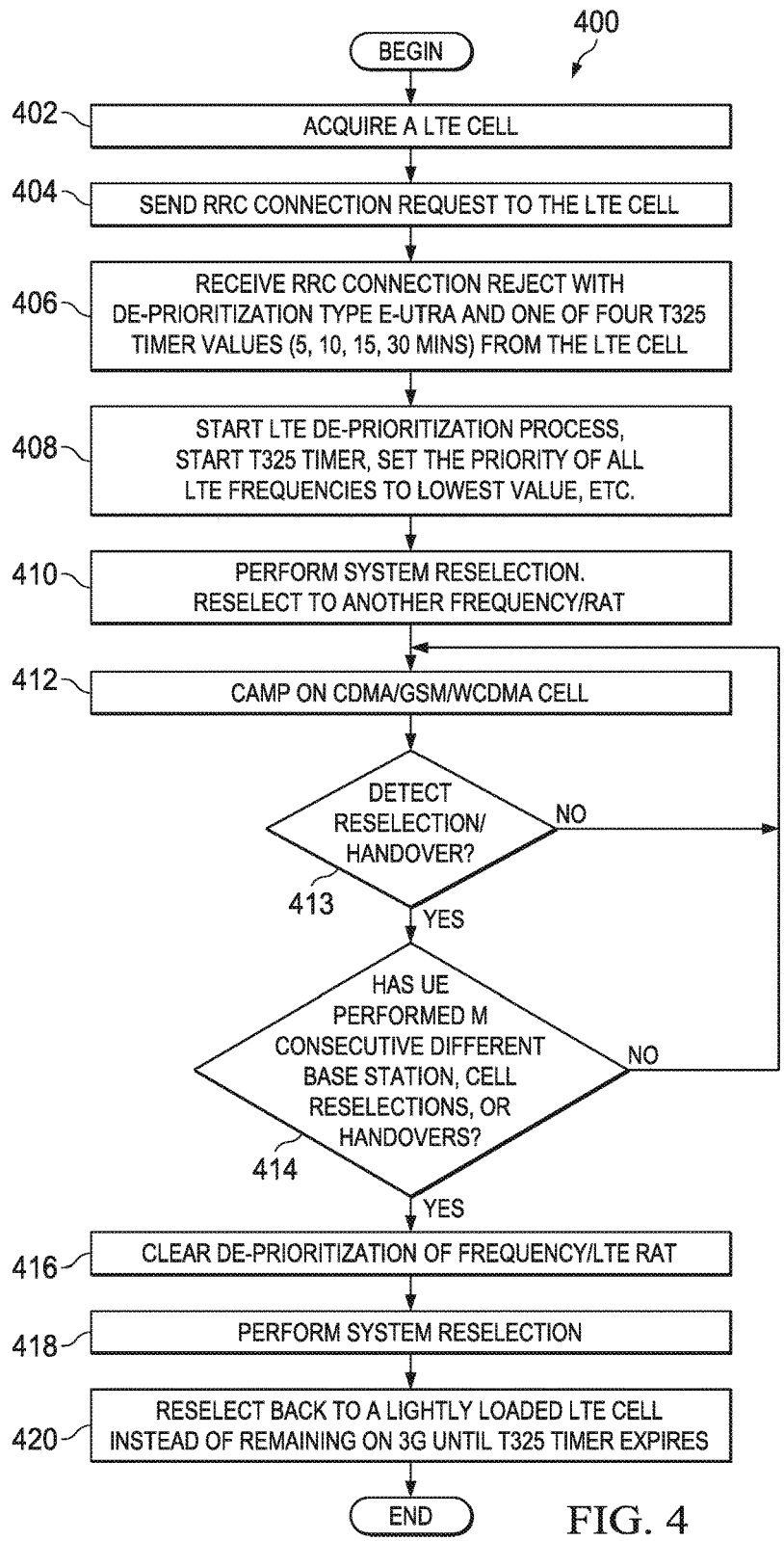

FIG. 4 is a flowchart of an embodiment of a method 400 in a UE for handling de-prioritization of E-UTRA. The UE clears de-prioritization of the LTE RAT immediately without waiting for T325 timer to expire after the UE detects that the detection criteria of UE traveling out of overloaded LTE cell is met. The method 400 is an example of an embodiment using a number M of consecutive different cell reselections/handovers as the detection criteria. In an embodiment, the method 400 does not count consecutive reselections/handovers between the same two cells (or among the same set of cells) in the detection criteria if the same cell (or the same set of cells) is reselected just after one other reselection. M is a configurable integer (i.e., 1, 2, 3, . . . ). The method 400 begins at block 402. Blocks 402, 404, 406, 408, 410, 412, and 413 are similar to corresponding blocks 302, 304, 306, 308, 310, 312, and 313 in FIG. 3, and proceed in a similar fashion. At block 414, the UE determines whether the UE has performed M consecutive different base station/cell reselections/handovers. If, at block 414, the answer is no, then the method 400 proceeds back to block 412. If, at block 414, the answer is yes, then the method 400 proceeds to block 416. Blocks 416, 418, and 420 are similar to block 316, 318, and 320 in FIG. 3. The method 400 proceeds through these blocks in a similar fashion to method 300.

Figure 5:
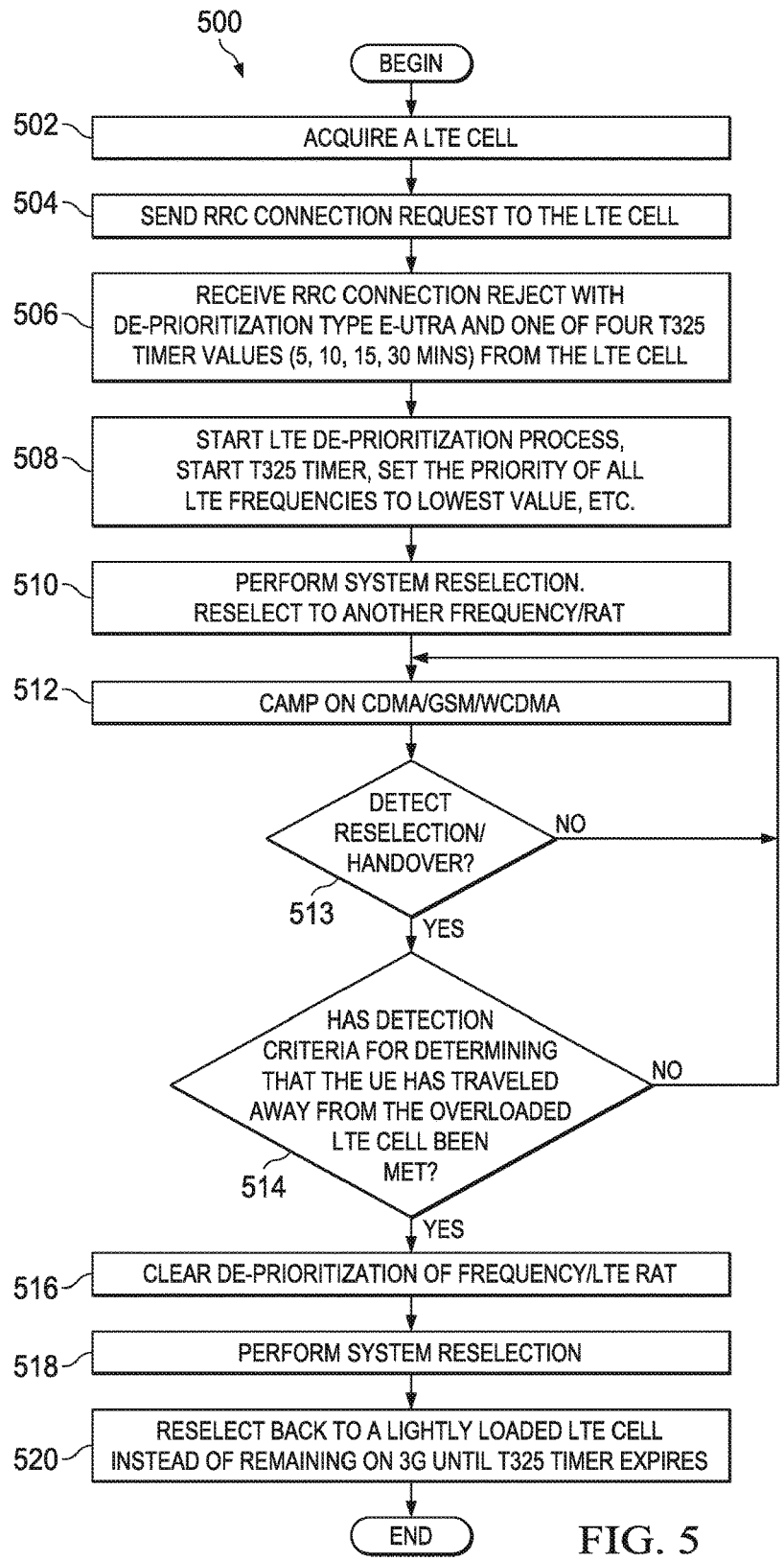

FIG. 5 is a flowchart of an embodiment of a method 500 in a UE for handling de-prioritization of E-UTRA. The UE clears de-prioritization immediately without waiting for T325 timer to expire after the UE detects that the detection criteria of UE traveling out of overloaded LTE cell is met. The method 500 is similar to method 400 and blocks 502, 504, 506, 508, 510, 512, 513, 516, 518, and 520 are performed in a similar fashion as corresponding blocks 402, 404, 406, 408, 410, 412, 413, 416, 418, and 420 except that the decision criteria for the detection criteria in block 514 is different from block 414. In block 514, the UE determines whether it has traveled out of the overloaded LTE cell area. The determination is made using registration zone change or SID/NID change for CDMA, routing area/location area change for GSM/WCDMA, or geographical region/location group change for all RATs. In other embodiments, block 514 uses other measurements/criteria to determine if the UE has traveled out of the overloaded LTE cell.

Figure 6A:
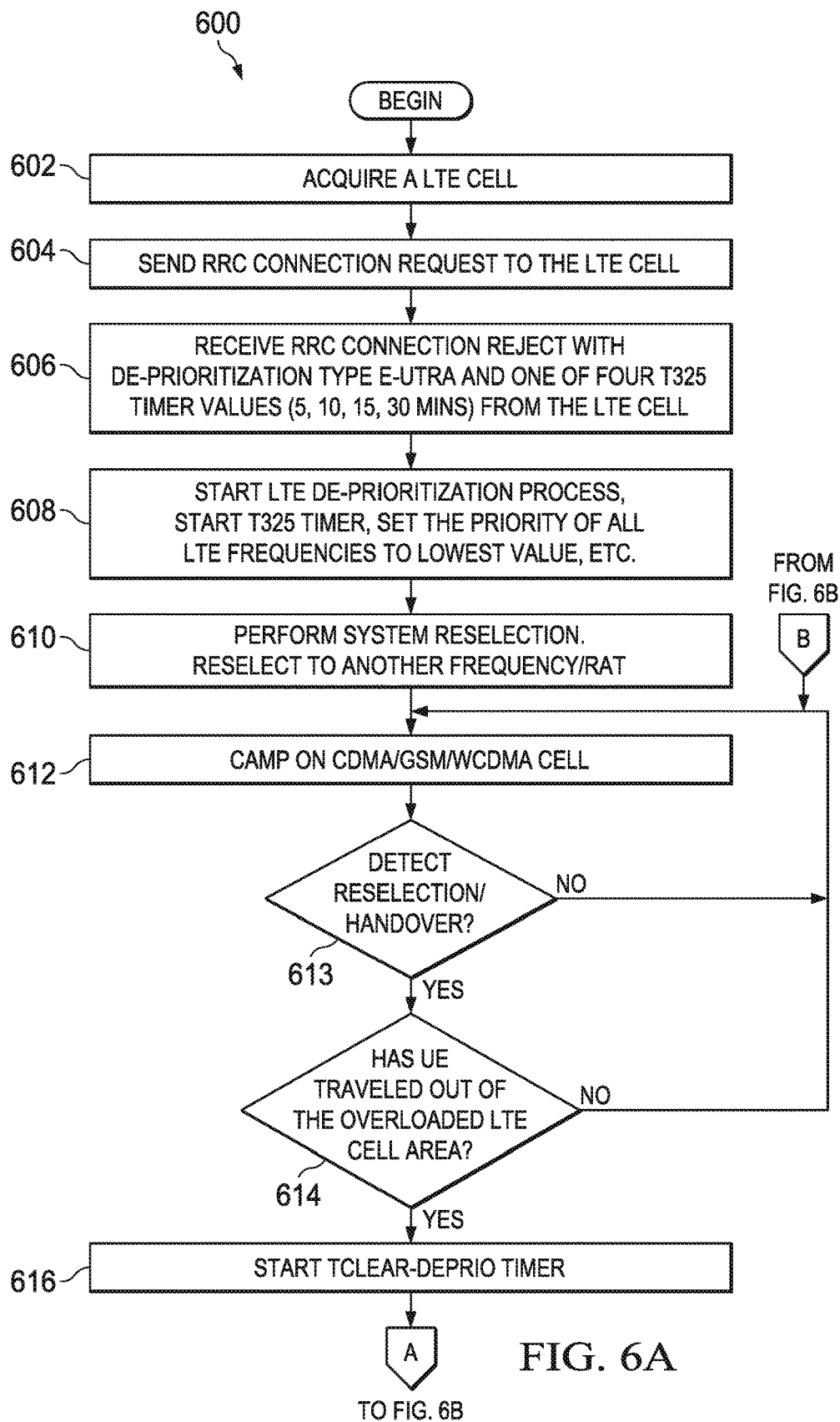
Figure 6B:
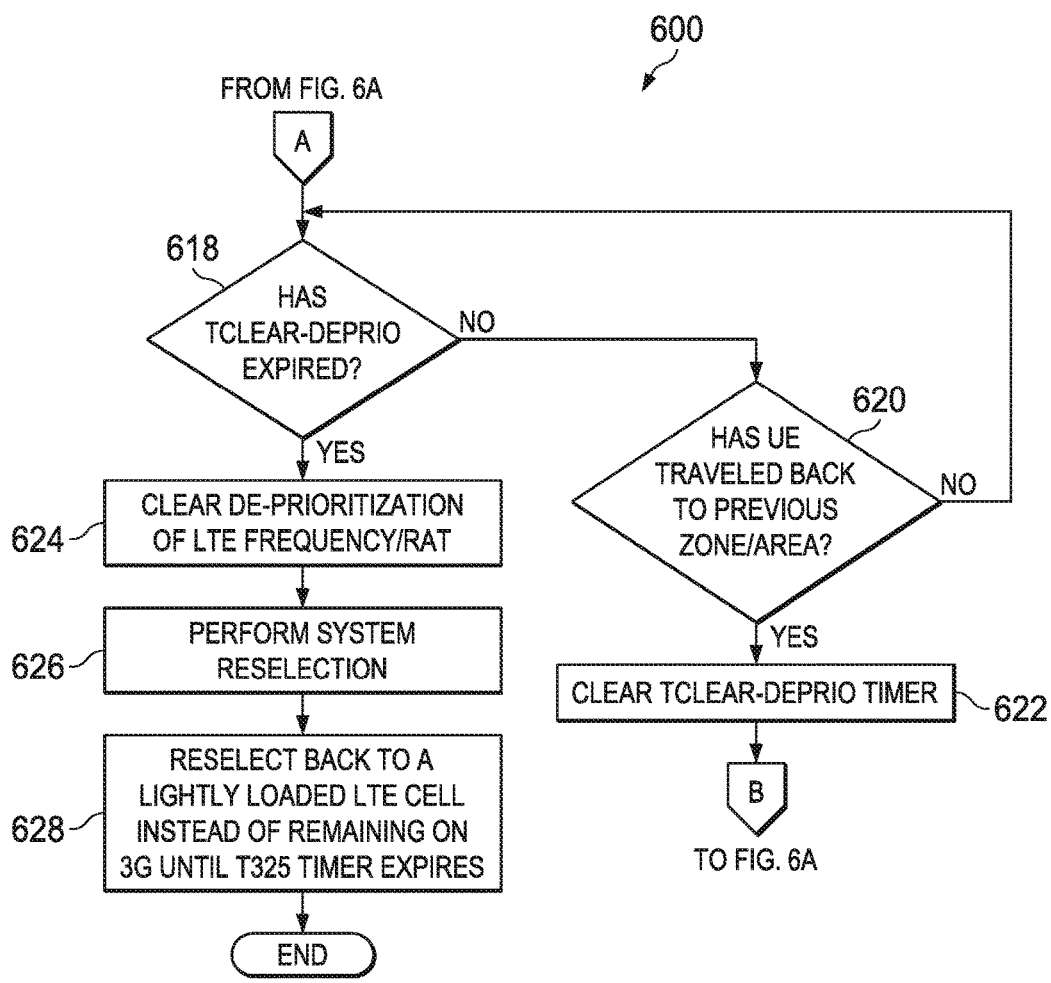

FIGS. 6A & 6B show a flowchart of an embodiment of a method 600 in a UE for handling de-prioritization of E-UTRA. The UE clears de-prioritization of LTE RAT (after a new timer Tclear-deprio expires) without waiting for T325 timer to expire upon the UE detects that the UE has traveled out of the overloaded LTE cell. The method 600 is an example of an embodiment in which a new configurable timer (Timer Tclear-deprio) is used as part of the detection criteria. The new timer is to avoid ping-ponging between registration zones, SID/NID, routing areas/location areas, locations/geographies. The Tclear-deprio timer is started when a UE detects that it travels out of the overloaded LTE cell. The de-prioritization timer is cleared when the Tclear-deprio timer expires. The Tclear-deprio timer helps insure that the UE is sufficiently far away from the first 4G LTE cell that it is unlikely to reenter the first cell before reselecting back to the 4G frequency range that had been deprioritized. This helps to keep the UE from "ping-ponging" back and forth between 3G and 4G in a short period of time. The method 600 begins at block 602. Blocks 602, 604, 606, 608, 610, 612, 613, and 614 are similar to blocks 502, 504, 506, 508, 510, 512, 513 and 514 in FIG. 5. At block 614, if the UE has traveled out of the overloaded LTE cell area, then the method 600 proceeds to block 616 where the UE starts the Tclear-deprio timer. At block 618, the UE determines if the Tclear-deprio timer has expired. If, at block 618, the Tclear-deprio timer has not expired, then the method 600 proceeds to block 620 where the UE determines if it has traveled back to a pervious zone/area (e.g., traveled back to a previous registration zone, SID/NID, routing area/location area, or geographic area). If, at block 620 the UE has traveled back to a previous zone or area, then the method 600 proceeds to block 622 where the UE clears the Tclear-deprio timer and the method 600 then proceeds to block 612. If, at block 620, the UE has not traveled back to a previous zone or area, then the method 600 proceeds back to block 618. If, at block 618, the UE determines that the Tclear-deprio timer has expired, then the method 600 proceeds to block 624 where the UE clears the de-prioritization timer of LTE frequency/RAT (e.g., clear the T325 timer, etc.). At block 626, the UE performs system reselection. At block 628, the UE reselects back to a lightly loaded LTE cell instead of remaining on the 3G system until the T325 timer expires, after which, the method 600 ends.

Figure 7:
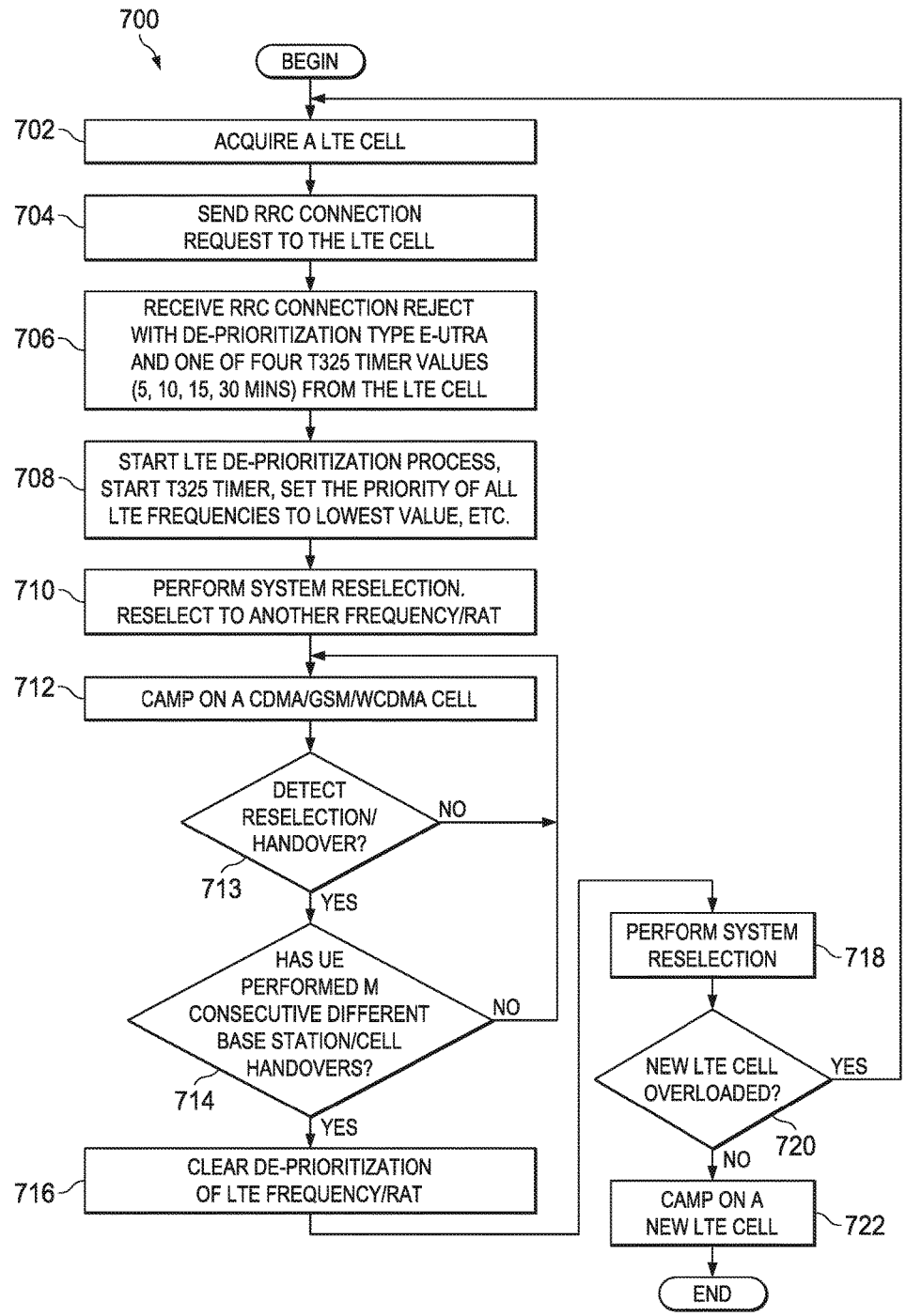

FIG. 7 is a flowchart of an embodiment of a method 700 in a UE for handling de-prioritization E-UTRA. The UE clears de-prioritization of LTE RAT without waiting for T325 timer to expire after the UE detects that the UE has traveled out of the overloaded LTE cell. The method 700 is similar to the method 400 shown in FIG. 3 except that after performing system reselection in block 718, the method 700 proceeds to block 720 where the UE determines if the new LTE cell is overloaded and, if yes, the method 700 proceeds to block 702. If, at block 702, the UE determines that the new LTE cell is not overloaded, then the method 700 proceeds to block 722 where the UE camps on a new LTE cell, after which the method 700 ends. Blocks 702, 704, 706, 708, 710, 712, 713, 714, 716, and 718 are similar to blocks 402, 404, 406, 408, 410, 412, 413, 414, 416 and 418 in FIG. 4.

Figure 8:
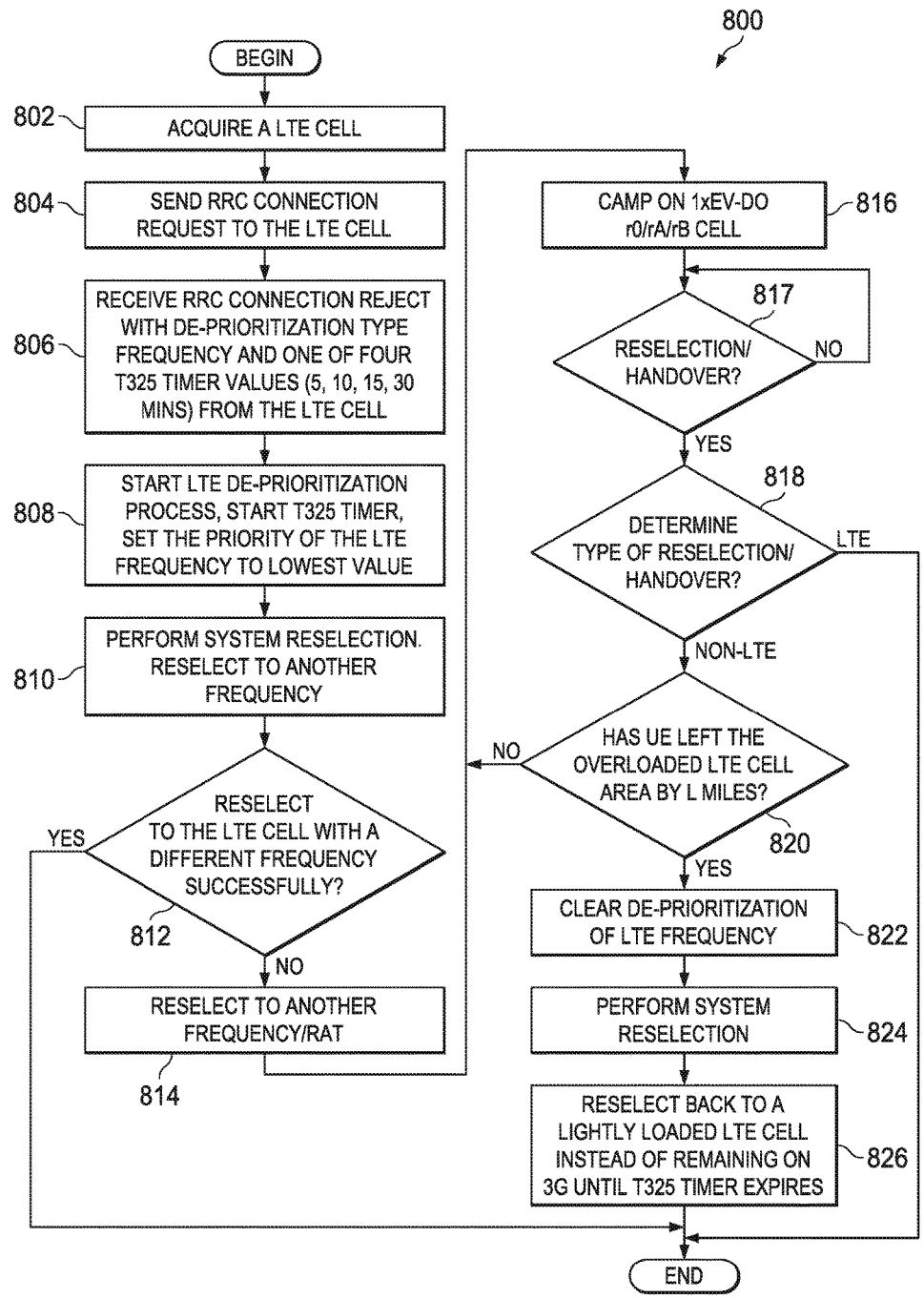
FIGS. 8, 9, 10, 11A, and 11B are flowcharts of various embodiments of methods in a UE for handling de-prioritization of frequency, wherein the UE clears the de-prioritization of the frequency before the de-prioritization timer T325 expires if and after the UE travels outside of the overloaded LTE cell.

FIG. 8 is a flowchart of an embodiment of a method 800 in a UE for handling de-prioritization of frequency. The UE clears de-prioritization of frequency before T325 timer expires after the UE detects that the UE has traveled out of the overloaded LTE cell. The method 800 begins at block 802 where the UE acquires a LTE cell. At block 804, the UE sends a RRC connection request to the LTE cell. At block 806, the UE receives a RRC connection reject with a de-prioritization type frequency and one of four T325 timer values (e.g., 5, 10, 15, and 30 minutes) from the LTE cell. The de-prioritization type frequency indicates that the carrier frequency should be set to the lowest priority value by the UE. At block 808, the UE starts the de-prioritization process, starts the T325 timer, and sets the priority of the LTE frequency to the lowest value, etc. At block 810, the UE performs system reselection selecting the RAT and frequency with the highest priority to the UE. At block 812, the UE determines whether it has successfully reselected to a LTE cell with a different frequency from the LTE frequency being de-prioritized. If, at block 812, the answer is yes, then the method 800 ends. If, at block 812, the answer is no, then the method 800 proceeds to block 814 where the UE reselects to another frequency and RAT (e.g., 3G). At block 816, the UE camps on the 1×EV-DO r0/rA/rB cell. At block 817, the UE determines if a reselection has occurred and, if not, the method 800 proceeds to block 816 where the UE remains camped on the 1×EV-DO r0/rA/rB cell. If, at block 817, the UE determines that a reselection/handover has occurred, then the method 800 proceeds to block 818 where the UE determines whether the handover is to a LTE cell with a different frequency or to a non-LTE cell. If, at block 818, the UE determines that the handover is to a LTE cell with a different frequency, then the method 800 ends. If, at block 818, the UE determines that the handover is to a non-LTE cell, then the method 800 proceeds to block 820 where the UE determines whether the UE has left the overloaded LTE cell area by a predetermined distance, L (e.g., L miles). If, at block 820, the UE determines that the UE has not left the overloaded LTE cell area by L miles, then the method 800 proceeds to block 816 where the UE remains camped on the 1×EV-DO r0/rA/rB. If, at block 820, the UE determines that the UE has left the overloaded cell area by the predetermined distance, then the method 800 proceeds to block 822 where the UE clears the de-prioritization of the frequency (i.e., clear the T325 times, etc.). At block 824, the UE performs system reselection. At block 826, the UE reselects back to a lightly loaded LTE cell with the same carrier frequency as the de-prioritized frequency instead of remaining on 3G until the expiration of the T325 timer to expire, after which, the method 800 ends.

Figure 9:
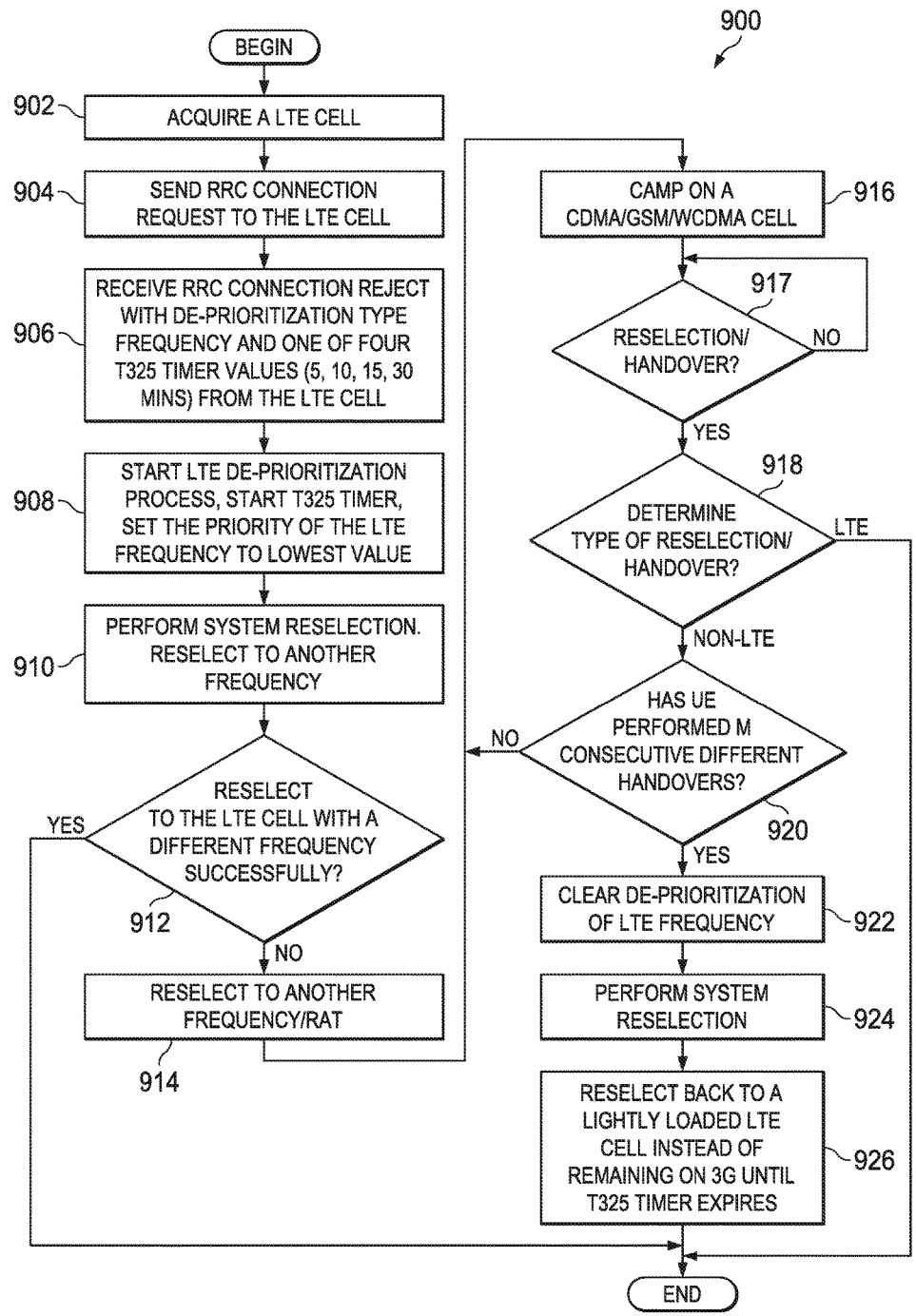

FIG. 9 is a flowchart of an embodiment of a method 900 in a UE for handling de-prioritization of frequency. The UE clears de-prioritization of frequency before the T325 timer expires after the UE detects that the UE has traveled out of the overloaded LTE cell. Method 900 is similar to method 800 in FIG. 8 except that rather than remaining camped on 1×EV-DO r0/rA/rB cell at block 816 as in method 800 in FIG. 8, in the method 900, the UE remains camped on the CDMA/GSM/WCDMA cell at block 916 and instead of determining whether the UE has moved a specified distance L away from the overloaded LTE cell in block 820, at block 920, the UE determines whether the UE has performed M consecutive different base station/cell reselections/handovers, where M is a configurable integer value. In an embodiment, the M consecutive different cell reselections/handovers does not count consecutive reselections between the same two cells (or among the same set of cells) in the detection criteria if the same cell (or the same set of cells) is reselected just after one other reselection. The remaining blocks in FIG. 9 (i.e., blocks 902, 904, 906, 908, 910, 912, 914, 917, 918, 922, 924, and 926) are similar to and perform in a similar fashion to the corresponding remaining blocks in FIG. 8 (i.e., blocks 802, 804, 806, 808, 810, 812, 814, 817, 818, 822, 824, and 826).

Figure 10:
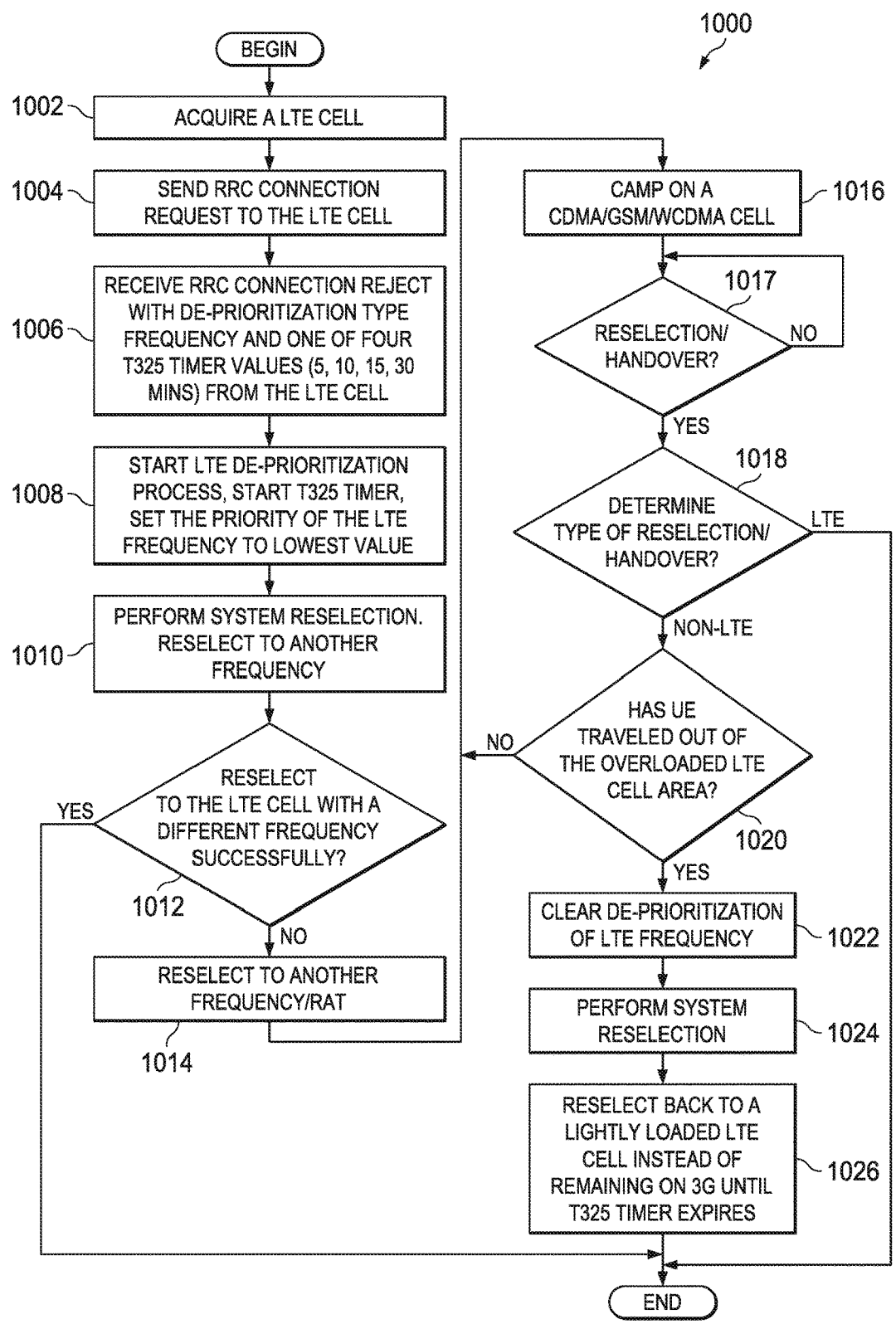

FIG. 10 is a flowchart of an embodiment of a method 1000 in a UE for handling de-prioritization of frequency. The UE clears de-prioritization of frequency before 7325 timer expires after the UE detects that the UE has traveled out of the overloaded LTE cell. Method 1000 is similar to method 800 in FIG. 8 except that rather than remaining camped on 1×EV-DO r0/rA/rB cell at block 816 in method 800 in FIG. 8, in the method 1000, the UE remains camped on CDMA/GSM/WCDMA cell at block 1016 and instead of determining whether the UE has moved a specified distance L away from the overloaded LTE cell in block 820, at block 1020, the UE determines whether the UE has traveled out of the overloaded LTE cell area by detecting a registration zone change or SID/NID change for CDMA, a routing area/location area change for GSM/WCDMA, or a geographical region/location group change for any RAT. The remaining blocks in FIG. 10 (i.e., blocks 1002, 1004, 1006, 1008, 1010, 1012, 1014, 1017, 1018, 1022, 1024, and 1026) are similar to and perform in a similar fashion to the corresponding remaining blocks in FIG. 8 (i.e., blocks 802, 804, 806, 808, 810, 812, 814, 817, 818, 822, 824, and 826).

Figure 11A:
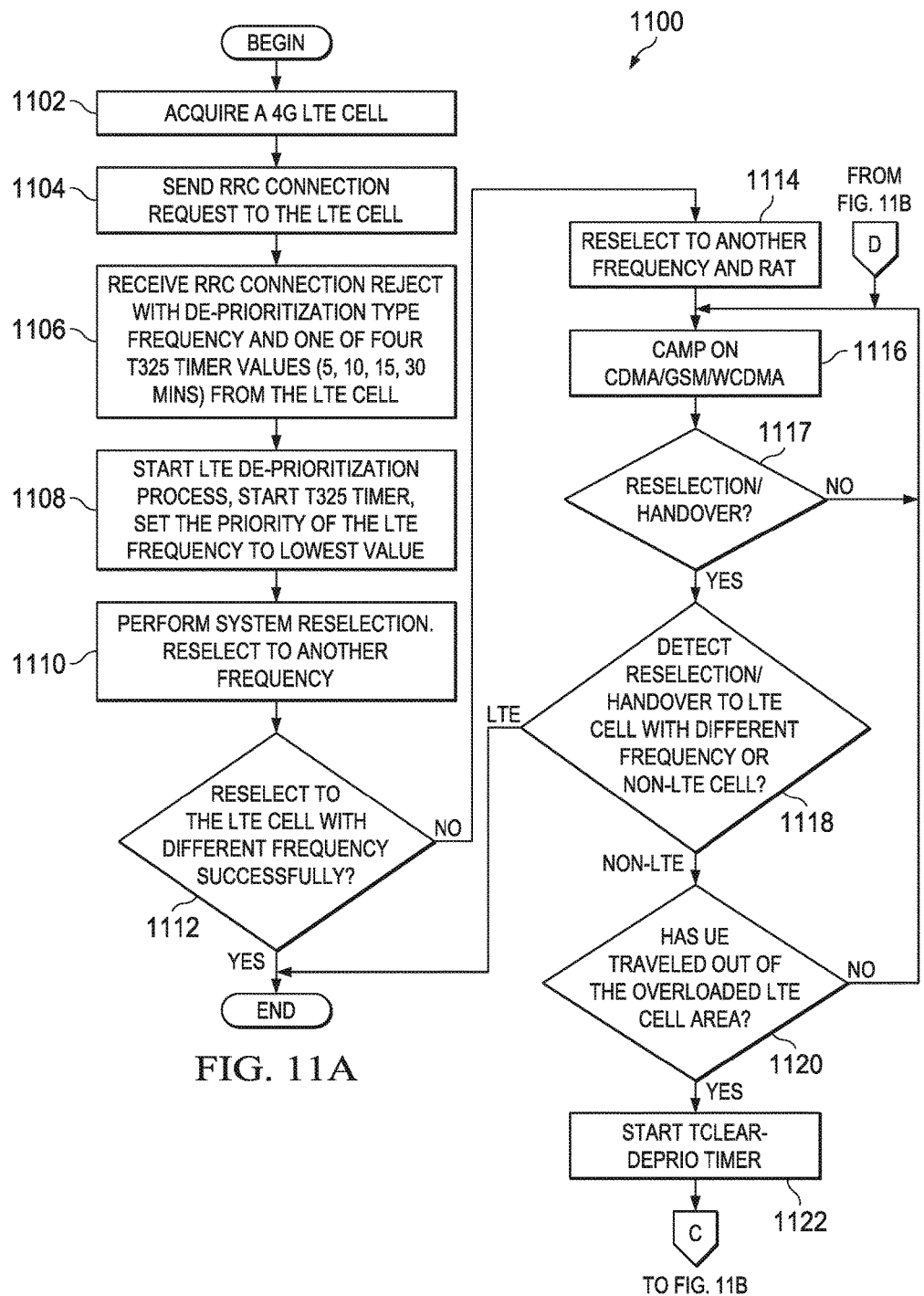
Figure 11B:
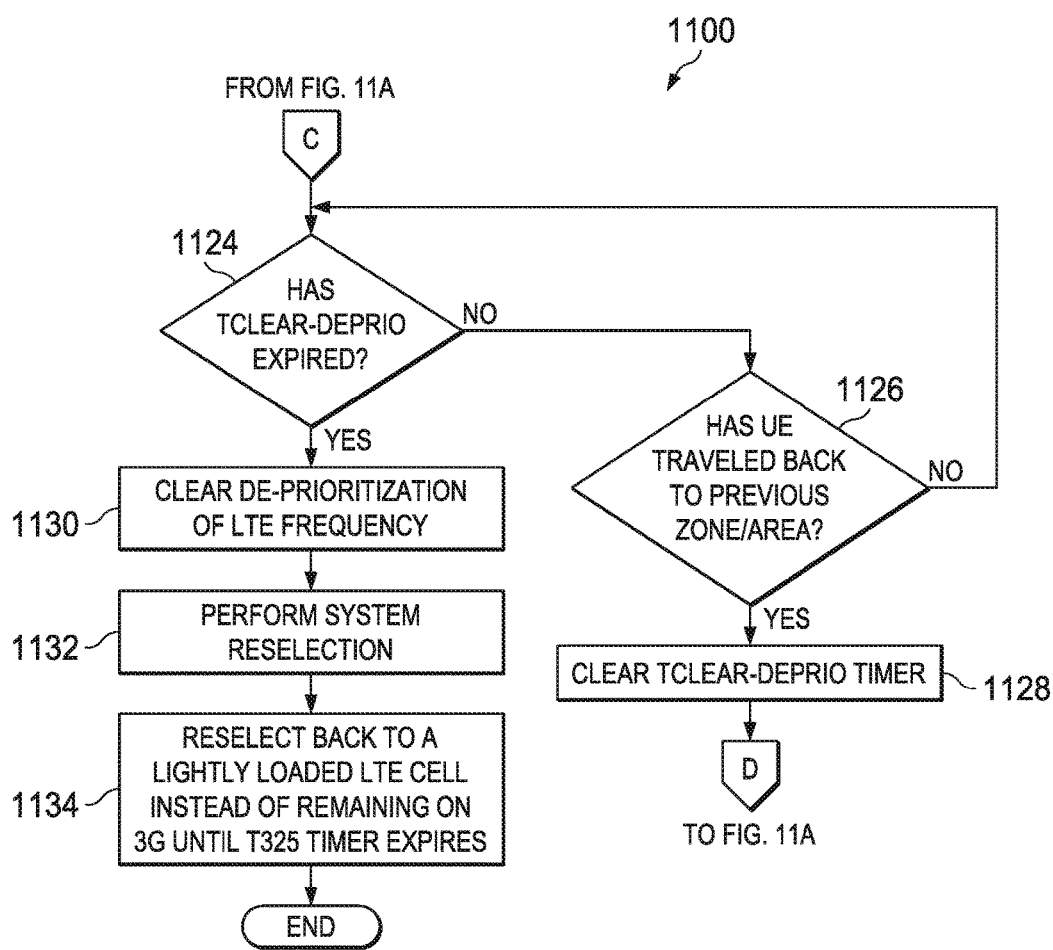

FIGS. 11A & 11B show a flowchart of an embodiment of a method 1100 in a UE for handling de-prioritization of frequency. The UE clears de-prioritization of frequency before T325 timer expires after the UE detects that the UE has traveled out of the overloaded LTE cell. The first portion of method 1100 is similar to the first portion of method 800 in FIG. 8 and the corresponding blocks of FIG. 11 (i.e., blocks 1102, 1104, 1106, 1108, 1110, 1112, and 1114) are similar to and perform in a similar fashion to the corresponding blocks in FIG. 8 (i.e., blocks 802, 804, 806, 808, 810, 812, and 814). At block 1116, the UE camps on a CDMA/GSM/WCDMA cell. At block 1117, the UE determines whether a reselection/handover has occurred and, if not, the method 1100 proceeds back to block 1116 and, if a reselection/handover has occurred, then the method 1100 proceeds to block 1118. At block 1118, the UE determines the type of reselection/handover that has occurred. If, at block 1118, the UE detects a reselection/handover to a LTE cell with a different frequency from that which was de-prioritized without waiting for the T325 timer to expire, then the method 1100 ends. If, at block 1118, the UE determines that the reselection/handover is to a non-LTE cell, then the method 1100 proceeds to block 1120. At block 1120, the UE determines whether the UE has traveled out of the overloaded LTE cell area by detecting a registration zone change or SID/NID change for CDMA, a routing area/location area change for GSM/WCDMA, or a geographical region/location group change for any RAT. If, at block 1120, the answer is no, then the method 1100 proceeds back to block 1116. If, at block 1120, the answer is yes, then the method 1100 proceeds to block 1122 where the UE starts a Tclear-deprio timer. The Tclear-deprio timer is used to avoid ping-ponging between registration zones, SID/NID, routing areas/location areas, or locations/geographies. The Tclear-deprio timer starts when a UE detects that it has traveled out of the overloaded LTE cell. At block 1124, the UE determines whether the Tclear-deprio timer has expired and, if not, the method 1100 proceeds to block 1126 where the UE determines whether the UE is back in the previous registration zone, SID/NID, routing area/location area, or geographical area. If, at block 1126, the answer is no, then the method 1100 proceeds back to block 1124. If, at block 1126, the answer is yes, then the method 1100 proceeds to block 1128 where the UE clears the Tclear-deprio timer and proceeds back to block 1116 without clearing the T325 timer. If, at block 1124, the UE determines that the Tclear-deprio timer has expired without the UE detecting that the UE is back in the previous registration zone, then the method 1100 proceeds to block 1130 where the UE clears the de-prioritization of LTE frequency (i.e., clear the T325 timer, etc.). At block 1132, the UE performs system reselection. At block 1134, the UE reselects back to a lightly loaded LTE cell using the preferred frequency (e.g., LTE) rather the remaining on 3G until the T325 timer expires, after which, the method 1100 ends.

Figure 12:
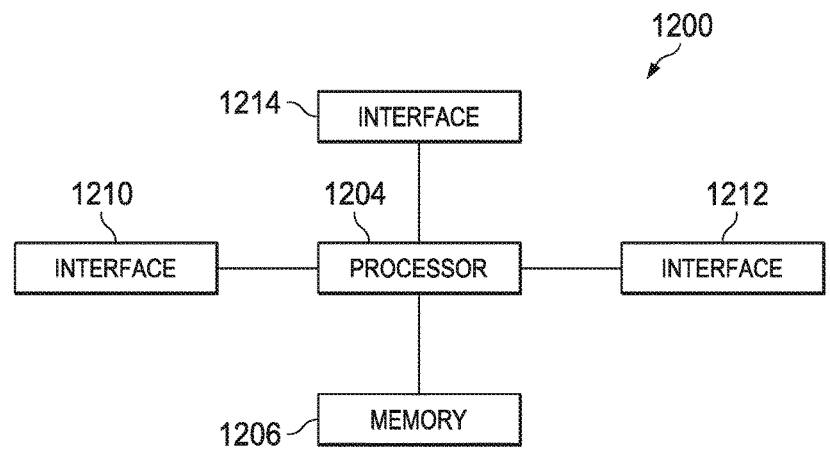
FIG. 12 illustrates a block diagram of an embodiment processing system for performing methods described herein, which may be installed in a host device.

FIG. 12 illustrates a block diagram of an embodiment processing system 1200 for performing methods described herein, which may be installed in a host device. As shown, the processing system 1200 includes a processor 1204, a memory 1206, and interfaces 1210-1314, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1210 is included in a network device that is accessing, or part otherwise of, a telecommunications network. In one example, the processing system 1210 is in a network-side device in a wireless or wireline telecommunications network, such as a base station, a relay station, a scheduler, a controller, a gateway, a router, an applications server, or any other device in the telecommunications network. In other embodiments, the processing system 1210 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
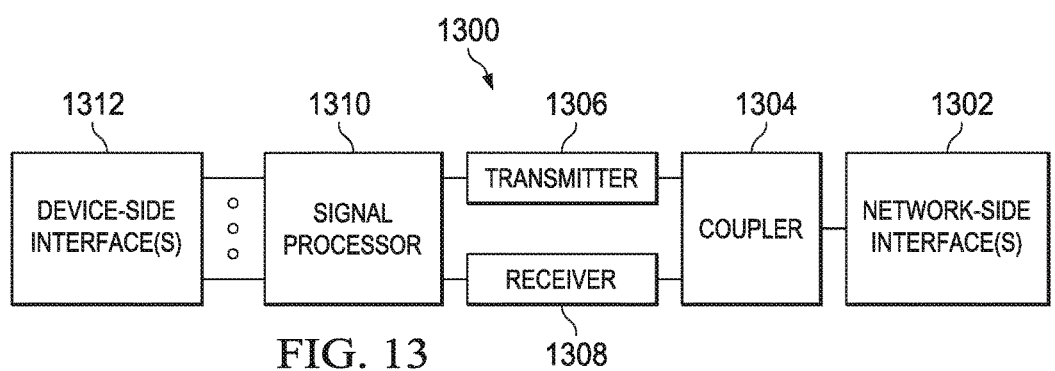
FIG. 13 illustrates a block diagram of a transceiver adapted to transmit and receive signaling over a telecommunications network.

In some embodiments, one or more of the interfaces 1210, 1212, 1214 connects the processing system 800 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Disclosed herein is an embodiment of a method performed by a mobile wireless device for connecting to a telecommunication network. The method includes sending a request to connect to a first cell of the telecommunication network, wherein the first cell implements a first connection technology; receiving from the first cell a connection rejection comprising a de-prioritization request, the de-prioritization request instructing the mobile wireless device to de-prioritize a frequency range of the first connection technology and comprising a de-prioritization timer indicating a time period for the frequency range to remain de-prioritized; in response to the de-prioritization request, connecting to the telecommunication network via a connection of a second connection technology, wherein the connection of the second connection technology is of a higher priority than the de-prioritized frequency range of the first connection technology but is of a lower data rate compared to the frequency range of the first connection technology; determining that the mobile wireless device has left the coverage area of the first cell; and connecting to a second cell of the telecommunication network via a connection in the frequency range of the first connection technology prior to the expiration of the de-prioritization timer. In an embodiment, the step of determining that the mobile wireless device has left the coverage area of the first cell includes determining that the mobile wireless device has traveled a predetermined distance from the first cell. In an embodiment, the step of determining that the mobile wireless device has left the coverage area of the first cell includes a determination of M consecutive different cell changes, M consecutive reselections, M consecutive handovers, or M consecutive base station (BS) changes, wherein M is a predefined integer. In an embodiment, the step of determining that the mobile wireless device has left the coverage area of the first cell includes determining a geographical region (GEO) change. In an embodiment, the method also includes connecting via the first connection speed responsive to a determination of a registration zone change, a routing area change, a location area change, a system identification number (SID) change, or a network identification number (NID) change. In an embodiment, the method includes receiving a detection criteria from the first cell, wherein the step of determining that the mobile wireless device has left the coverage area of the first cell comprises determining that the mobile wireless device has left the coverage area of the first cell according to the detection criteria received from the first cell. In an embodiment, the timer is a first timer and the method also includes connecting via the first connection speed responsive to a determination that the mobile wireless device has left the coverage area of the first cell and a determination that the second timer has expired; and refraining from connecting via the first connection speed and clearing the second timer responsive to a determination that the mobile wireless device travels back to previous zone or area prior to the expiration of the second timer. In an embodiment, the connection rejection includes an RRCConnectionReject message comprises a de-prioritization request type and the de-prioritization timer, wherein the de-prioritization request type indicates that the mobile wireless device is to de-prioritize a current carrier frequency or radio access technology (RAT), and wherein the de-prioritization timer indicates a period for which the current carrier frequency or the RAT is to be de-prioritized.

Disclosed herein is an embodiment of a mobile wireless device. The mobile wireless device includes a processor and a non-transitory computer readable storage medium storing programming for execution by the processor, the programming including instructions to: send a request to connect to a first cell of the telecommunication network, wherein the first cell implements a first connection technology; receive from the first cell a connection rejection comprising a de-prioritization request, the de-prioritization request instructing the mobile wireless device to de-prioritize a frequency range of the first connection technology and comprising a de-prioritization timer indicating a time period for the frequency range to remain de-prioritized; connect to the telecommunication network via a connection of a second connection technology in response to the de-prioritization request, wherein the connection of the second connection technology is of a higher priority than the de-prioritized frequency range of the first connection technology but is of a lower data rate compared to the frequency range of the first connection technology; determine that the mobile wireless device has left the coverage area of the first cell; and connect to a second cell of the telecommunication network via a connection in the frequency range of the first connection technology prior to the expiration of the de-prioritization timer Disclosed herein is an embodiment of a method in a mobile wireless device for network selection. The method includes sending, by the mobile wireless device, a request to connect to an access point (AP) via a first service; receiving, by the mobile wireless device, an instruction from the AP to connect to a network through a second service and a timer, the timer specifying a time period for the mobile wireless device to wait before attempting to switch to the first service; selecting, by the mobile wireless device, the second service; and reselecting, by the mobile wireless device, to the first service before expiration of the timer when a determination is made that an detection criteria is satisfied. In an embodiment, the AP is an overloaded cell and the determination that the detection criteria is satisfied includes a determination that the mobile wireless device has traveled away from the overloaded cell. The detection criteria includes a specified distance from the AP. In an embodiment, the distance is configurable. In another embodiment, the detection criteria includes M consecutive different cell changes, reselections, handovers, or APs, wherein M is a configurable integer. In an embodiment, the detection criteria includes a location group change. In an embodiment, the detection criteria includes one of a registration zone change, a system identification number (SID) change, and a network identification number (NID) change. In an embodiment, the detection criteria is received by the wireless mobile device from the AP. The detection criteria is dynamically configurable in some embodiments. In some embodiments, the detection criteria is dynamically configurable according to radio access network (RAN) conditions and/or according to a value of the timer. In an embodiment, the timer is a first timer, wherein the detection criteria comprises a second timer, wherein a determination that the mobile wireless device has traveled out of an area covered by the AP and a determination that the second timer has expired allows the mobile wireless device to reselect back to the first service before the expiration of the first timer, and wherein the second timer is reset if the mobile wireless device travels back to an area covered by the AP. In an embodiment, the first service is a preferred service.

Also disclosed herein is a mobile wireless device configured for network reselection for load balancing and user experience improvement. The mobile wireless device includes a processor and a non-transitory computer readable storage medium storing programming for execution by the processor, the programming including instructions to: send a request to connect to an access point (AP) via a first service; receive an instruction from the AP to connect to a network through a second service and a timer, the timer specifying a time period for the mobile wireless device to wait before attempting to switch to the first service; select the second service; and reselect to the first service before expiration of the timer when a determination is made that an detection criteria is satisfied.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method performed by a mobile wireless device, comprising:
 transmitting, by the mobile wireless device, a request to connect to a first cell;
 receiving, by the mobile wireless device, an indication to de-prioritize one or more frequencies, of a first connection frequency range, used to connect to the first cell, the indication indicating a time period for the one or more frequencies to remain de-prioritized;
 determining, by the mobile wireless device, that the mobile wireless device has left a coverage area of the first cell and entered into a coverage area of a second cell prior to an expiration of the time period, and based on the determination, clearing a de-prioritization of the one or more frequencies, the first cell and the second cell being in an equivalent network; and connecting, by the mobile wireless device, to the second cell via a non de-prioritized connection using one of the one or more frequencies.

2. The method of claim 1, further comprising:
connecting, by the mobile wireless device, to the first cell via a second connection of a second connection frequency range prior to expiration of the time period.

3. The method of claim 1, wherein determining that the mobile wireless device has left the coverage area of the first cell comprises a determination of M consecutive different cell changes, M consecutive reselections, M consecutive handovers, or M consecutive base station (BS) changes, wherein M is a predefined integer.

4. The method of claim 1, wherein determining that the mobile wireless device has left the coverage area of the first cell comprises determining a geographical region (GEO) change.

5. The method of claim 1, further comprising connecting via a first connection frequency range responsive to a determination of a registration zone change, a routing area change, a location area change, a system identification number (SID) change, or a network identification number (NID) change.

6. The method of claim 1, further comprising:
receiving a detection criteria from the first cell, wherein determining that the mobile wireless device has left the coverage area of the first cell comprises determining that the mobile wireless device has left the coverage area of the first cell according to the detection criteria received from the first cell.

7. The method of claim 1, wherein the time period is a first time period, the method further comprising:
connecting via the first connection frequency range responsive to a determination that the mobile wireless device has left the coverage area of the first cell and a determination that a second time period has expired; and
refraining from connecting via the first connection frequency range and clearing a second timer associated with the second time period responsive to a determination that the mobile wireless device travels back to an area covered by the first cell prior to expiration of the second time period.

8. A mobile wireless device, comprising:
a non-transitory memory storage comprising instructions; and
a processor in communication with the non-transitory memory storage, wherein the processor executes the instructions to:
transmit a request to connect to a first cell;
receive an indication to de-prioritize one or more frequencies, of a first connection frequency range, used to connect to the first cell, the indication indicating a de-prioritization time period for the one or more frequencies to remain de-prioritized;
determine that the mobile wireless device has left a coverage area of the first cell and entered into a coverage area of a second cell prior to an expiration of the de-prioritization time period, and based on the determination, clearing a de-prioritization of the one or more frequencies, the first cell and the second cell being in an equivalent network; and
connect to the second cell via a non de-prioritized connection using one of the one or more frequencies.

9. The mobile wireless device of claim 8, wherein the processor executes the instructions to:
connect to the first cell via a second connection of a second connection frequency range prior to expiration of the de-prioritization time period.

10. The mobile wireless device of claim 8, wherein the processor executes the instructions to determine that the mobile wireless device has left the coverage area of the first cell comprises a determination of M consecutive different cell changes, M consecutive reselections, M consecutive handovers, or M consecutive base station (BS) changes, wherein M is a predefined integer.

11. The mobile wireless device of claim 8, wherein the processor executes the instructions to determine that the mobile wireless device has left the coverage area of the first cell comprises a determination of a geographical region (GEO) change.

12. The mobile wireless device of claim 8, wherein the processor executes the instructions to connect, via the first connection frequency range responsive to a determination of a registration zone change, a routing area change, a location area change, a system identification number (SID) change, or a network identification number (NID) change.

13. The mobile wireless device of claim 8, wherein the processor executes the instructions to:
receive a detection criteria from the first cell, wherein determining that the mobile wireless device has left the coverage area of the first cell comprises determining that the mobile wireless device has left the coverage area of the first cell according to the detection criteria received from the first cell.

14. The mobile wireless device of claim 8, wherein the de-prioritization time period is a first de-prioritization time period, and wherein a first de-prioritization timer is associated with the first de-prioritization time period, the processor executes the instructions to:
connect via the first connection frequency range responsive to a determination that the mobile wireless device has left the coverage area of the first cell and a determination that a second de-prioritization time period has expired; and
refrain from connecting via the first connection frequency range and clearing a second de-prioritization timer associated with the second de-prioritization time period responsive to a determination that the mobile wireless device travels back to an area covered by the first cell prior to expiration of the second de-prioritization time period.

15. A non-transitory computer-readable media storing computer instructions for execution in a mobile wireless device, that when executed by one or more processors, cause the one or more processors to perform the steps of:
transmitting a request to connect to a first cell;
receiving an indication to de-prioritize one or more frequencies, of a first connection frequency range, used to connect to the first cell, the indication indicating a de-prioritization time period for the one or more frequencies to remain de-prioritized;
determining that the mobile wireless device has left a coverage area of the first cell and entered into a coverage area of a second cell prior to an expiration of the de-prioritization time period, and based on the determination, clearing a de-prioritization of the one or more frequencies, the first cell and the second cell being in an equivalent network; and
connecting to the second cell via a non de-prioritized connection using one of the one or more frequencies.

16. The non-transitory computer-readable media of claim 15, wherein the instructions further comprise instructions that cause the one or more processors to perform the step of:

connecting to the first cell via a second connection of a second connection frequency range prior to expiration of the de-prioritization time period.

17. The non-transitory computer-readable media of claim 15, wherein determining that the mobile wireless device has left the coverage area of the first cell comprises a determination of M consecutive different cell changes, M consecutive reselections, M consecutive handovers, or M consecutive base station (BS) changes, wherein M is a predefined integer.

18. The non-transitory computer-readable media of claim 15, wherein determining that the mobile wireless device has left the coverage area of the first cell comprises determining a geographical region (GEO) change.

19. The non-transitory computer-readable media of claim 15, wherein the instructions further comprise instructions that cause the one or more processors to perform the step of connecting via the first connection frequency range responsive to a determination of a registration zone change, a routing area change, a location area change, a system identification number (SID) change, or a network identification number (NID) change.

20. The non-transitory computer-readable media of claim 15, wherein the instructions further comprise instructions that cause the one or more processors to perform the step of:

receiving a detection criteria from the first cell, wherein determining that the mobile wireless device has left the coverage area of the first cell comprises determining that the mobile wireless device has left the coverage area of the first cell according to the detection criteria received from the first cell.

* * * * *